US012354765B2

(12) United States Patent
Straessle et al.

(10) Patent No.: US 12,354,765 B2
(45) Date of Patent: Jul. 8, 2025

(54) METHOD AND DEVICE FOR TWISTING SINGLE CABLES

(71) Applicant: komax Holding AG, Dierikon (CH)

(72) Inventors: Cassian Straessle, Waedenswil (CH); Dominik Staubli, Horw (CH); Jan Lochmatter, Boniswil (CH)

(73) Assignee: komax Holding AG, Dierikon (CH)

( * ) Notice: Subject to any disclaimer, the term of this patent is extended or adjusted under 35 U.S.C. 154(b) by 197 days.

(21) Appl. No.: 18/009,811

(22) PCT Filed: Jun. 26, 2020

(86) PCT No.: PCT/EP2020/068162
§ 371 (c)(1),
(2) Date: Dec. 12, 2022

(87) PCT Pub. No.: WO2021/259504
PCT Pub. Date: Dec. 30, 2021

(65) Prior Publication Data
US 2023/0223171 A1 Jul. 13, 2023

(51) Int. Cl.
*B21F 15/04* (2006.01)
*B21F 15/02* (2006.01)
*H01B 13/02* (2006.01)

(52) U.S. Cl.
CPC ......... *H01B 13/0207* (2013.01); *B21F 15/02* (2013.01); *B21F 15/04* (2013.01)

(58) Field of Classification Search
CPC . B21F 7/00; B21F 15/02; B21F 15/04; H01B 13/0207; H01B 13/0278
See application file for complete search history.

(56) References Cited

U.S. PATENT DOCUMENTS 6,167,919 B1 * 1/2001 Fuchsl ............... H01B 13/0207 140/149
9,416,488 B2 8/2016 Stier et al.
(Continued)

FOREIGN PATENT DOCUMENTS

DE 196 31 770 A1 2/1998
EP 1 032 095 A2 8/2000
(Continued)

OTHER PUBLICATIONS

International Search Report in PCT/EP2020/068162, dated Feb. 18, 2021.
(Continued)

*Primary Examiner* — Debra M Sullivan
(74) *Attorney, Agent, or Firm* — Collard & Roe, P.C.

(57) ABSTRACT

A method and a device twist single cables about a twisting axis. The single cables each run along a cable axis and have wires, which are twisted in a strand twisting direction to form a strand, and also each have a first cable end and a second cable end. The first cable ends are held separately by a single rotating unit in each case. The second cable ends are held by a twisting unit. The second cable ends are rotated jointly about the twisting axis counter to the strand twisting direction to produce a twisted cable bundle. During the joint rotation, the first cable ends are rotated separately about a cable axis of the respective single cable, in the same rotation direction as the joint rotation. The single cables are each relieved of torsion thereby.

15 Claims, 3 Drawing Sheets

(56) References Cited

U.S. PATENT DOCUMENTS

| | | | | |
|---|---|---|---|---|
| 2009/0241314 | A1* | 10/2009 | Watanabe | H01B 13/0271 29/33 F |
| 2014/0190741 | A1 | 7/2014 | Hayakawa | |
| 2018/0130571 | A1 | 5/2018 | Masui | |

FOREIGN PATENT DOCUMENTS

| | | | |
|---|---|---|---|
| GB | 1 062 862 | A | 3/1967 |
| JP | 2011-258330 | A | 12/2011 |
| JP | 2013-182848 | A | 9/2013 |
| JP | 2014-135153 | A | 7/2014 |
| JP | 2014-237909 | A | 12/2014 |
| JP | 6171103 | B2 | 7/2017 |
| JP | 2018-078007 | A | 5/2018 |
| JP | 2018-118259 | A | 8/2018 |
| KR | 10-2010-0088862 | A | 8/2010 |
| WO | 98/06155 | A1 | 2/1998 |
| WO | 2013/068990 | A1 | 5/2013 |

OTHER PUBLICATIONS

Letter to European Patent Office in PCT/EP2020/068162, dated Apr. 22, 2022, with English translation.

PCT—International Preliminary Report on Patentability Of PCT/EP2020/068162 Dated Jun. 17, 2022 (English translation).

* cited by examiner

METHOD AND DEVICE FOR TWISTING SINGLE CABLES

CROSS REFERENCE TO RELATED APPLICATIONS

This application is the National Stage of PCT/EP2020/068162 filed on Jun. 26, 2020, the disclosure of which is incorporated by reference. The international application under PCT article 21(2) was not published in English.

TECHNICAL FIELD

The disclosure relates to a method and a device for twisting single cables, in particular for twisting single cables in pairs to form a cable bundle.

PRIOR ART

Cable bundles, which are obtained from single cables by means of twisting (hereinafter: cable bundle twisting), are required in various industrial areas of application. The single cables each have a strand, which, in turn, is formed from twisted wires (hereinafter: strand twisting). An insulation surrounds the respective strand of the single cable. The single cables are usually cut to a certain length, i.e. trimmed, prior to the cable bundle twisting, and are optionally also assembled, i.e. provided with a contact part or the like.

EP 1 032 095 A2 discloses a twisting device for simultaneously processing three conductor pairs. A conductor pair, i.e. a pair of single cables, is clamped between a holding unit and a twisting head. The twisting head is rotated about a twisting axis, whereby the twisting process is performed. The resulting shortening of the conductor pair is compensated by means of a shifting of the twisting head parallel to the twisting axis. The twisting device disclosed in EP 1 032 095 A2 serves the purpose of assembling as well as of twisting the cables (hereinafter referred to as automatic production). In a known modification, a twisting device is used only for twisting, but not for assembling the cables (hereinafter referred to as semi-automatic production). In the case of a device according to the modification, the compensation of the twisting-related shortening of the conductor pair takes place, for example, by means of a shifting of the holding unit parallel to the twisting axis.

WO 2013/068990 A1 discloses a twisting device similar to the twisting device disclosed in EP 1 032 095 A2, whereby two twisting heads are provided, which rotate in opposite directions.

WO 98/06155 A1 discloses a twisting device like the twisting device disclosed in EP 1 032 095 A2, whereby instead of the holding unit, an untwisting unit is in each case provided for each cable end, which rotate in the same direction of rotation as the twisting head during the twisting process.

PROBLEM TO BE SOLVED

The specified properties, which a cable bundle obtained by means of cable bundle twisting is to have, comprise, e.g., a desired lay length, or twisting lay length, and a desired number of lays, or number of twisting lays. Lay length is generally understood to be the distance or the averaged distance of two adjacent, identical crossings of the single cables from one another when projected onto a plane. The number of lays then amounts to the sum of these crossings.

The cable bundle obtained by means of cable bundle twisting always has a certain elasticity around the twisting axis. In the case of a cable bundle, which is obtained by means of cable bundle twisting according to EP 1 032 095 A2 or WO 2013/068990 A1, the cable bundle (here: cable pair) tends to untwist again counter to the twisted state after conclusion of the twisting process, thus to untwist at least partially again. The number of lays and/or the lay length can thus vary in an inadmissible manner or can deviate from the specified values. It is known to counteract this phenomenon in that the twisting process is continued farther than is necessary for the desired lay length and/or number of lays ("over-twisting"). A rotational movement in the opposite direction can be performed subsequently ("back-twisting"), so that the elastic deformation of the cable bundle is reduced or decreased, respectively. High torsional forces can occur due to the over-twisting, which can be unwanted or inadmissible, respectively, in particular in the case of cables with a small strand cross section.

An attempt is made in WO 98/06155 A1 to avoid excessively high torsional forces, in that the untwisting units perform a torsion compensation during the twisting process. Due to the fact that the cable ends are no longer clamped in the untwisting units in a rotationally fixed manner with respect to the twisting head, a guide unit in the form of a drill shuttle is provided for specifying the lay length. The guide unit separates the two cables by means of a pin and moves from the twisting head towards the untwisting units during the twisting process.

In the case of the cable bundles obtained according to WO 98/06155 A1, however, the lay lengths scatter in an inadmissible manner, i.e. the deviation of the lay lengths between two identical cable bundles, but also the deviation of the lay lengths within the same cable bundle, can be inadmissibly high. In the case of the cable bundles obtained by means of the technology according to WO 98/06155 A1, distances between the crossings, which are sometimes too large, also form between the single cables (so-called large eyes), which reduces the quality of the obtained cable bundle.

In view of the above problems, the object is to specify an improved option for twisting single cables to form a cable bundle.

SUMMARY OF THE INVENTION

According to one aspect, a method for twisting single cables about a twisting axis is provided. The single cables each run along a cable axis. Each single cable has a plurality of wires, which are twisted to form a strand, namely in a strand twisting direction. Each single cable additionally has a first cable end and a second cable end. The method comprises a separate holding of the first cable ends and a holding of the second cable ends as well as subsequently a joint rotation of the second cable ends about the twisting axis counter to the strand twisting direction to create a twisted cable bundle comprising a specified or specifiable number of lays and/or comprising a specified or specifiable twisting lay length. During the joint rotation, the first cable ends are each rotated about the cable axis of the respective single cable, namely in the same direction of rotation as the joint rotation for relieving the respective single cable of tension.

According to a further aspect, a device is provided, which is configured for carrying out the method described herein. The device has single, or individual, rotating units and a twisting unit. The single rotating units are configured for separately holding a respective one of the first cable ends. The twisting unit is configured for holding the second cable ends. The single rotating units and the twisting unit are arranged so that they hold the single cables essentially parallel to the twisting axis.

BRIEF DESCRIPTION OF THE DRAWINGS

Further aspects, features, advantages, and effects follow from the embodiments, which will be described below with reference to the drawings. In the drawings.

DESCRIPTION OF EMBODIMENTS

Figure 1:
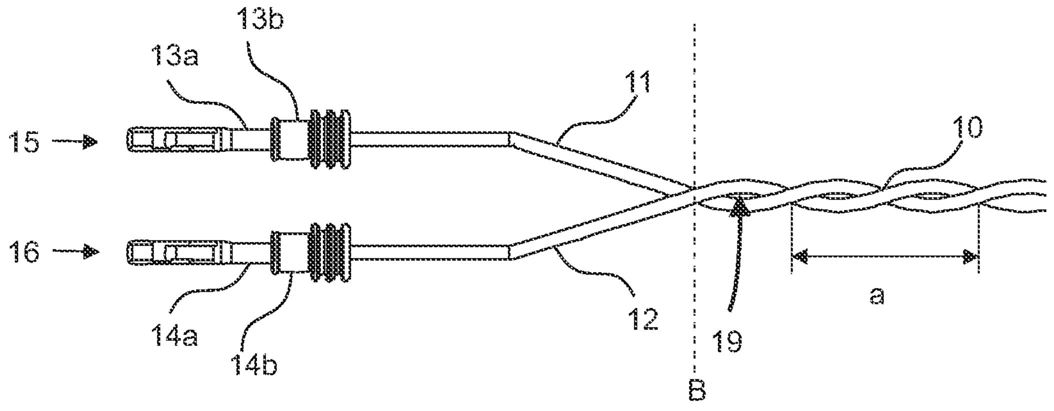
FIG. 1 shows a schematic illustration of a region of a cable bundle, to explain terms used herein.

FIG. 1 shows a schematic illustration of a region of a cable bundle, which, as a whole, is identified with 10. The cable bundle comprises a single cable 11 as well as a single cable 12, as a cable pair. Note that the number of two single cables 11, 12 is exemplary and not limiting, and that the aspects and features described herein can also be applied completely or partially to cable bundles comprising more than two single cables 11, 12, and that identical or similar effects result. In the case of embodiments, two single cables 11, 12 can nevertheless be used for one cable bundle 10.

In FIG. 1, a first cable end 15 of the single cable 11 and a first cable end 16 of the single cable 12 are located on the same side. For example, the first cable ends 15, 16 are already assembled, in the present case in the form of a contact 13*a* and of a grommet 13*b* on the first cable end 15, and of a contact 14*a* and of a grommet 14*b* on the second cable end 16. The single cables 11, 12 each have a strand, which, in turn, is formed from twisted wires and which will be described in more detail below with reference to FIG. 5. In a region, which lies to the right of the dashed line identified with B in FIG. 1, the single cables 11, 12 are twisted, whereby points result, in which the single cables 11, 12 cross one another, in a projection plane, for example in the drawing plane from FIG. 1. An identical crossing in the projection plane is present when the same sequence of single cables is present at two crossings in the direction perpendicular to the projection plane. The distance of two adjacent identical crossings is referred to as twisting lay length or, in short, also simply as lay length, which is identified with a. Two eyes 19, which should be as small as possible for a high-quality cable bundle 10, result between two adjacent identical crossings in the projection plane.

The terms from FIG. 1 are also adopted in the following paragraphs, and the description thereof will not be repeated.

Figure 2:
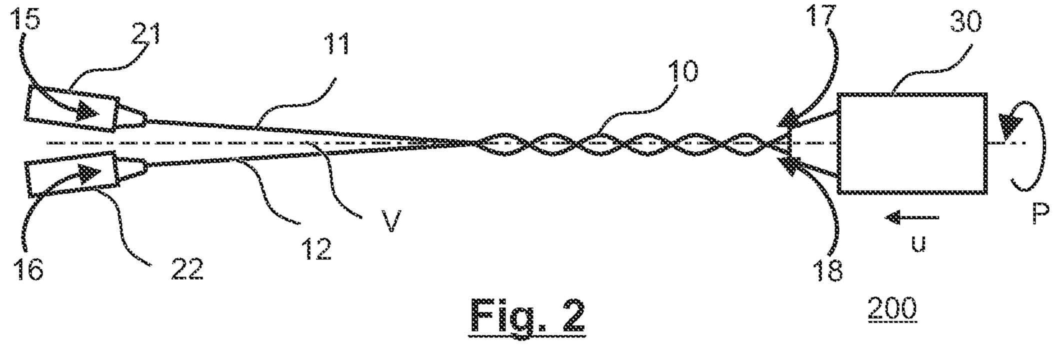
FIG. 2 shows a schematic illustration of a twisting device comprising a twisting unit and a holding unit.

FIG. 2 shows a schematic illustration of a general twisting device 200 comprising a clamped cable bundle 10 of two single cables 11, 12. A second end 17 of the single cable 11 is located opposite the first end 15 of the single cable 11. A second end 18 of the single cable 12 is therefore located opposite the first end 16 of the single cable 12. The second end 17 and the second end 18 are clamped jointly into a twisting unit 30. The first end 15 is clamped into a first holding unit 21. The first end 16 is clamped into a second holding unit 22. The twisting unit 30 is configured so that it can rotate about a twisting axis V for performing a twisting process in a twisting direction P. To compensate for the shortening of the single cables 11, 12, which twist around one another, during the twisting process, the twisting unit 30 can be shifted essentially parallel to the twisting axis V in a direction u. A direction running parallel to the twisting axis V, as used herein, also includes the direction on the twisting axis V itself.

Figure 3:
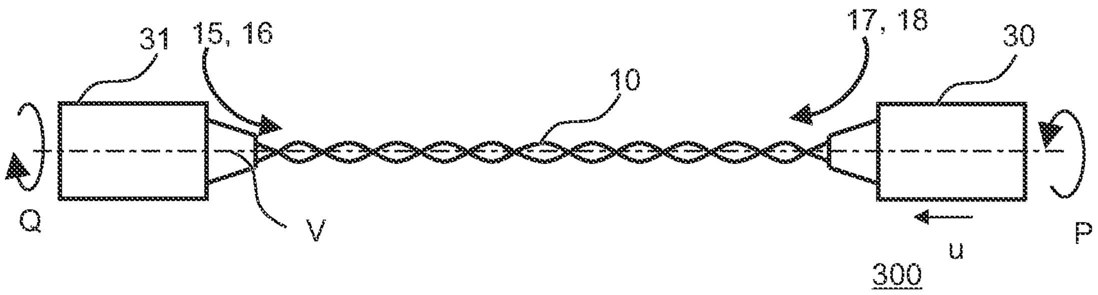
FIG. 3 shows a schematic illustration of a twisting device comprising two twisting units arranged opposite one another.

FIG. 3 shows a twisting device 300 according to the twisting device 200 from FIG. 2. In contrast to the twisting device 200, the holding units 21, 22 are not present in the case of the twisting device 300. Instead, a further twisting unit 31 is provided. The front ends 15, 16 are clamped jointly into the further twisting unit 31. While the twisting unit 30 is configured so that it can rotate about a twisting axis V while performing a twisting process in a twisting direction P, the further twisting unit 31 is configured so that it can rotate about the twisting axis while performing the twisting process in the opposite direction Q.

In the case of the twisting devices 200, 300 illustrated in FIGS. 2 and 3, an essentially even lay length a over a sufficiently large region of the cable bundle results in the case of a sufficient mechanical pre-tensioning of the single cables 11, 12. The lay length is largely dependent on the material properties of the single cables 11, 12 and on the number of rotations of the twisting unit 30 and optionally of the further twisting unit 31 during the twisting process. In particular in the case of smaller strand cross sections, a torsion of the single cables 11, 12, i.e. a high mechanical pre-tensioning of the single cables, is not desired.

Figure 4:
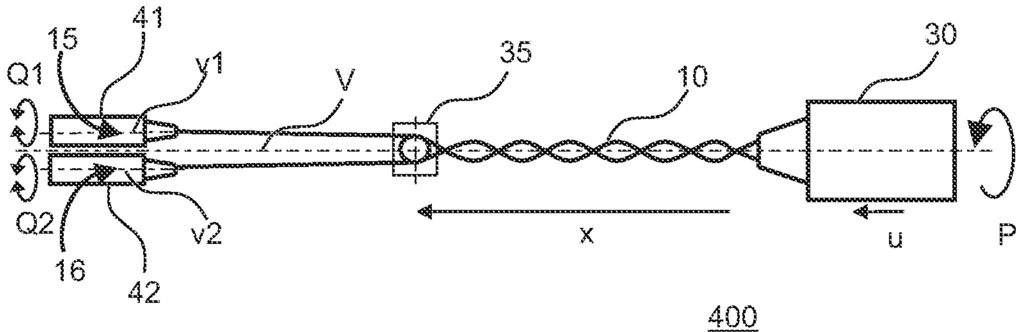
FIG. 4 shows a schematic illustration of a twisting device comprising a twisting unit and a respective single rotation unit for each single cable.

FIG. 4 shows a twisting device 400 analogously to FIG. 2 and FIG. 3, which can be used for performing a method, which is disclosed herein, according to an embodiment. The twisting device 400 differs from the twisting device 300 from FIG. 3, e.g., in that a single rotating unit (individual rotating unit) 41 is provided for clamping the first end 15 of the single cable 11, and that a single rotating unit 42 is provided for clamping the first end 16 of the single cable 12. The single rotating unit 41 is arranged so that it holds the first end 15 of the clamped single cable 11 along its cable axis v1 on the first end 15. The single rotating unit 42 is arranged so that it holds the first end 16 of the clamped single cable 12 along its cable axis v2 on the first end 16. Both single rotating units 41, 42 are additionally arranged so that they hold the single cables 11, 12 essentially parallel to the twisting axis V on the respective first ends 15, 16.

In FIG. 4, the twisting device 400 additionally comprises a guide means 35 for at least partially separating the single cables 11, 12. The guide means 35 can be shifted essentially parallel to the twisting axis V in a direction x. By means of a guided or controlled shifting of the guide means 35 during a twisting process, the lay length a can be kept constant or varied, as needed.

As in the case of the twisting devices 200, 300 according to FIG. 2 and FIG. 3, the twisting unit 30 in the case of the twisting device 400 according to FIG. 4 can also be rotated about the twisting axis V at least in the twisting direction P, i.e. can be driven in a rotatory manner about the twisting axis. The single rotating unit 41 can optionally be rotated back and forth about the cable axis v1. This is suggested by means of the double arrow Q1 in FIG. 4. The single rotating unit 42 can therefore optionally be rotated back and forth about the cable axis v2. This is suggested by means of the double arrow Q2 in FIG. 4.

The method disclosed herein provides that the first cable ends 15, 16 are held separately, for example by means of the separate single rotating units 41, 42 according to the device 400 from FIG. 4. This holding characterizes for example the state prior to the start of the twisting process, when the single cables 11, 12 are clamped into the device 400, i.e. the twisting process follows the holding.

During the twisting process, the second cable ends 17, 18 are rotated jointly about the twisting axis V, and a twisted cable bundle 10 comprising a specified or specifiable number of twisting lays and/or comprising a specified or specifiable twisting lay length a is thus created.

In contrast to the methods known from the prior art, this joint rotation about the twisting axis V takes place counter to the strand twisting direction, which will be described further below with reference to FIG. 5.

Again in contrast to the methods known from the prior art, each of the first cable ends 15, 16 is rotated separately about its respective cable axis v1, v2 during this joint rotation, namely in the same direction of rotation as this joint rotation. This takes place, for example, by driving the corresponding single rotating device 41, 42 in the matching direction of rotation Q1 or Q2, respectively. The respective single cable 11, 12 is relieved of torsion thereby.

Relieving of torsion, as used herein, comprises, for example, a decrease or elimination of a torsional force or of a torsional moment, which would be created by means of the joint rotation in each single cable 11, 12. In order to attain the advantages described herein, the relieving of torsion or untwisting must not necessarily take place completely. This means that over the course of time of the twisting process, the (total) angle of rotation of the twisting unit 30 can be smaller than the (total) angle of rotation of the single rotating units 41, 42.

In the case of the method described herein, a twisting in opposite lay thus takes place. Opposite lay thereby identifies the counter-rotatability between the (rotatory) cable twisting direction and the (rotatory) strand twisting direction.

Figure 5:
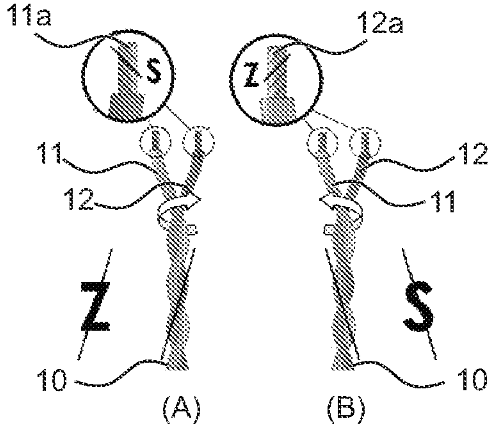
FIG. 5 shows a schematic illustration of a cable bundle comprising single cables, to explain strand twisting direction and cable twisting direction.

FIG. 5 shows, schematically, the cable bundle 10 of, for example, two single cables 11, 12 and the respective strands thereof in two alternatives: In alternative A (on the left in FIG. 5), the strand twisting direction runs clockwise (strand twisting direction S), when looking at the cable end. The twisted wires 11*a*, 12*a*, which form the strand in alternative A, thus run from the top left to the bottom right in the illustrated projection plane. The single cables 11, 12, which form the twisted cable bundle 10 in alternative A, thus run from the bottom left to the top right (cable twisting direction Z) in the illustrated projection plane. In alternative B (on the right in FIG. 5), the strand twisting direction runs counter-clockwise (strand twisting direction Z), when looking at the cable end. The twisted wires 11*a*, 12*a*, which form the strand in alternative B, thus run from the bottom left to the top right in the illustrated projection plane. The single cables 11, 12, which form the twisted cable bundle 10 in alternative B, thus run from the top left to the bottom right (cable twisting direction S) in the illustrated projection plane.

It has been shown that a twisted cable bundle 10 with a very low variability or deviation, respectively, of lay length and number of lays and with very small eyes can be obtained by means of the method described herein. At the same time, each single cable 11, 12 is twisted only slightly with an approach according to the method described herein. The obtained cable bundles 10 do not have any or only a minimal tendency towards untwisting.

Figure 6:
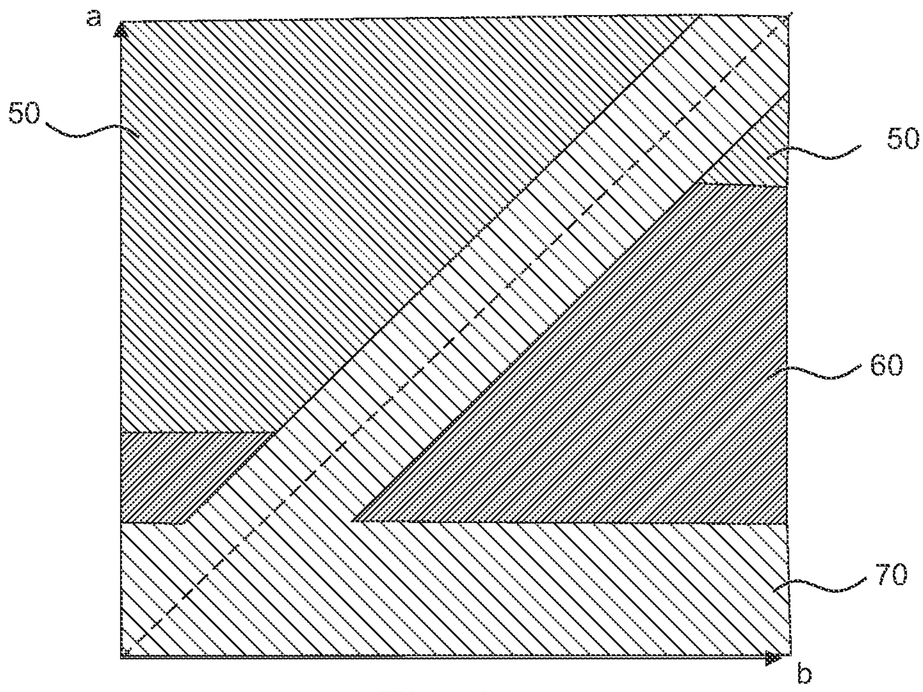
FIG. 6 shows a diagram, which shows regions for the producibility of a cable bundle for an alternative "lang lay twisting"
Figure 7:
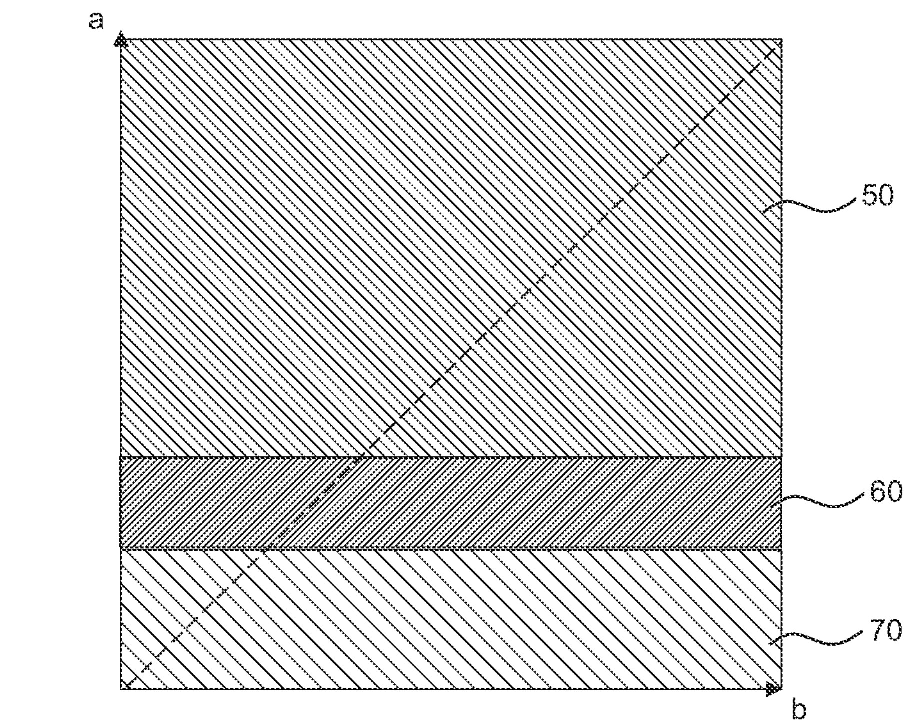
FIG. 7 shows a diagram, which shows regions for the producibility of a cable bundle for an alternative "opposite lay twisting".

FIG. 6 shows a diagram, in the case of which the twisting lay length a (the cable lay length) is plotted qualitatively compared to the strand lay length b, namely during a twisting in lang lay (equal lay) according to the prior art. FIG. 7, in turn, shows a diagram in the case of which the twisting lay length a (the cable stroke length) is plotted qualitatively compared to the strand lay length, namely during a twisting in opposite lay (reverse lay), as in the case of the method described herein. The region, in which the cable bundle displays good quality properties, is in each case specified with reference numeral 50. The region, in which the cable bundle no longer displays optimal quality properties, is in each case specified with reference numeral 60. The region, in which the cable bundle can no longer be produced, is in each case specified with reference numeral 70. It has been shown that the approach in opposite lay according to the method described herein results in a significant process improvement.

Further alternatives and embodiments will be described below with joint reference to the drawings, which have been described in more detail above.

According to one embodiment, the method further comprises—prior to the joint rotation—a separate rotation of each of the first cable ends 15, 16 about the cable axis v1, v2 of the respective single cable for pre-torsioning. Pre-torsioning, as used herein, comprises a systematic application of a torsion onto the respective single cable prior to the twisting process. The pre-torsioning takes place in such a way that a torsion-related damage to the respective single cable is avoided. The pre-torsioning has an effect comparable to the over-twisting with subsequent back-twisting, which has been described above with reference to the prior art. It has been shown, however, that the strands are strained less. In the case of the method, which has been expanded by the pre-torsioning, it has furthermore been shown that the single cables 11, 12 abut rest against one another more tightly in the pre-twisted cable bundle 10, and that the eye size is reduced, without having to increase the pre-tensioning. The twisted cable bundle 10 also remains more dimensionally stable. The tendency towards the automatic untwisting of the untwisted cable ends 15, 16; 17, 18 is further reduced.

In one alternative, the separate rotation for the pre-torsioning is in each case performed in the strand twisting direction S, Z. In this alternative, the geometry of the helix of the twisted cable bundle 10 can be compensated in the respective single cables x, whereby the torsion in the twisted cable bundle 10 is reduced or even completely eliminated.

In another alternative, the separate rotation for the pre-torsioning is in each case performed counter to the strand twisting direction S, Z. In this alternative, the formation of large eyes can be further reduced. In addition, the tendency towards the automatic untwisting of the untwisted cable ends 15, 16; 17, 18 can be further reduced in this alternative.

According to one embodiment, the separate rotation for the pre-torsioning of each of the first cable ends 15, 16 is performed about an angle of rotation, which is maximally 10% of the total angle of rotation, which is necessary to reach the number of twisting lays, of the second cable ends 17, 18. It has been shown that such a pre-torsioning of maximally 10% of the number of lays can be sufficient in order to attain the effects and advantages described herein.

According to one embodiment, the method further comprises a repeated determination of a variable, which is associated with a torsional moment or a torsional stress of at least one of the single cables. The separate rotation of the first cable ends about the cable axis of the respective single cable is performed until the determined variable falls below a predetermined or predeterminable threshold value.

According to one embodiment, the method further comprises a trimming of the single cables. In the alternative or in addition, the method further comprises attaching one or several contact parts 13*a*, 13*b*, 14*a*, 14*b* to at least one of the first cable end 15, 16 and of the second cable end 17, 18.

According to one embodiment, the method further comprises moving the first and second cable ends towards one another. A twist-related shortening of the cable bundle can be compensated thereby. For example, the twisting unit 30 is movably arranged parallel to the twisting axis V for this purpose. In the alternative or in addition, all single rotating units 41, 42 are movably arranged parallel to the twisting axis V for this purpose. For this purpose, the device 400 is configured, for example, so that it moves the first and second cable ends 15, 16; 17, 18 towards one another by means of the movably arranged twisting unit 30 and/or single rotating units 41, 42, for compensating the twist-related shortening of the cable bundle.

According to one embodiment relating to the device 400, the twisting unit 30 is movably arranged parallel to the twisting axis V. In the alternative or in addition, all single rotating units 41, 42 are movably arranged parallel to the twisting axis V. The device 400 is configured so that it applies a tensile force essentially parallel to the twisting axis V for extending the single cables 11, 12 and/or the cable bundle 10. The extension can take place prior to the twisting and/or during the twisting. A further improved homogeneity of the twisted cable bundle 10, in particular of the lay length a, can be attained thereby.

According to one embodiment relating to the device 400, the latter comprises the guide means 35 for at least partially separating the single cables 11, 12. The guide means 35 can be shifted essentially parallel to the twisting axis V in a direction x. The device 400 is configured so that the guide means 35 is moved essentially synchronously to a rotation-related variable of the twisting unit 30 in the direction x of the first cable ends 15, 16. A further improved homogeneity of the twisted cable bundle 10, in particular of the lay length a, can be attained thereby.

Note that the aspects, features, and embodiments described herein can be combined as needed in the context of the actions of a person of skill in the art and/or that individual features can be varied or omitted. The described embodiments are exemplary, and the features thereof can be modified or adapted, where appropriate, and combined and/or omitted, without deviating from the scope of the present disclosure, which is specified by the claims.

The invention claimed is:

1. A method for twisting single cables about a twisting axis, wherein the single cables each run along a cable axis, and wherein each single cable comprises a strand, each strand comprising twisted wires having a strand twisting direction, and wherein the single cables each comprise a first cable end and a second cable end, wherein the method comprises the following processes in this sequence:

separately holding the first cable ends, and holding the second cable ends;

jointly rotating the second cable ends about the twisting axis in a direction counter to the strand twisting direction to create a twisted cable bundle comprising a specified or specifiable number of lays and/or comprising a specified or specifiable twisting lay length; and while jointly rotating the second cable ends about the twisting axis, separately rotating the first cable ends about the cable axis of the respective single cable in the same direction of rotation as the second cable ends are jointly rotated about the twisting axis to relieve the respective single cable of tension.

2. The method according to claim 1, further comprising:

prior to jointly rotating the second cable ends about the twisting axis, separately rotating each of the first cable ends about the cable axis of the respective single cable for pre-torsioning.

3. The method according to claim 2, wherein the second cable ends are jointly rotated about the twisting axis by a selected angle of rotation to reach the specified or specifiable number of lays and wherein each of the first cable ends is separately rotated about the cable axis by an angle of rotation no more than 10% of the selected angle of rotation.

4. The method according to claim 1, further comprising:

prior to jointly rotating the second cable ends about the twisting axis, separately rotating each of the first cable ends about the cable axis of the respective single cable for pre-torsioning in a direction identical to the strand twisting direction.

5. The method according to claim 1, further comprising:

prior to jointly rotating the second cable ends about the twisting axis, separately rotating each of the first cable ends about the cable axis of the respective single cable for pre-torsioning in a direction counter to the strand twisting direction.

6. The method according to claim 1, further comprising:

repeatedly determining a variable associated with a torsional moment or a torsional stress of at least one of the single cables, wherein the first cable ends are separately rotated about the cable axis of the respective single cable until a determined variable falls below a predetermined or predeterminable threshold value.

7. The method according to claim 1, wherein the cable bundle comprises two single cables.

8. The method according to claim 1, further comprising:

trimming the single cables; and/or attaching one or several contact parts to at least one of the first cable end and of the second cable end of the single cables.

9. The method according to claim 1, further comprising:

prior to jointly rotating the second cable ends about the twisting axis, applying a tensile force essentially along the twisting axis for extending the single cables.

10. The method according to claim 1, further comprising:

moving the first and second cable ends towards one another for compensating a twist-related shortening of the cable bundle.

11. A device for twisting single cables about a twisting axis, wherein the single cables in each case run along a cable axis and comprise wires, which are in each case twisted to form a strand in a strand twisting direction, as well as in each case a first cable end and in each case a second cable end, wherein the device comprises:

single rotatable clamps each configured to separately hold a respective one of the first cable ends;

a twisting head configured to hold the second cable ends, wherein the single rotatable clamps and the twisting head are arranged so that they hold the single cables essentially parallel to the twisting axis, wherein the device is configured for carrying out the method according to claim 1.

12. The device according to claim 11, wherein the twisting head is configured to be driven in a rotatory manner about the twisting axis.

13. The device according to claim 11, wherein either the twisting head or all single rotatable clamps, or both the twisting head and all single rotatable clamps are additionally movably arranged essentially parallel to the twisting axis, and wherein the device is configured to move the first and second cable ends towards one another for compensating a twist-related shortening of the cable bundle.

14. The device according to claim 11, wherein either the twisting head or all single rotatable clamps, or both the twisting head and all single rotatable clamps are additionally movably arranged essentially along the twisting axis, and wherein the device is configured to apply prior to jointly rotating the second cable ends about the twisting axis, a tensile force essentially parallel to the twisting axis for extending the single cables.

15. The device according to claim 11, which further comprises a guide arranged between the single rotatable clamps and the twisting head, wherein the guide is configured to separate the single cables at least in some regions.

* * * * *